(No Model.)
A. A. TAYLOR & W. C. EDWARDS.
LUBRICATOR.
No. 470,085. Patented Mar. 1, 1892.
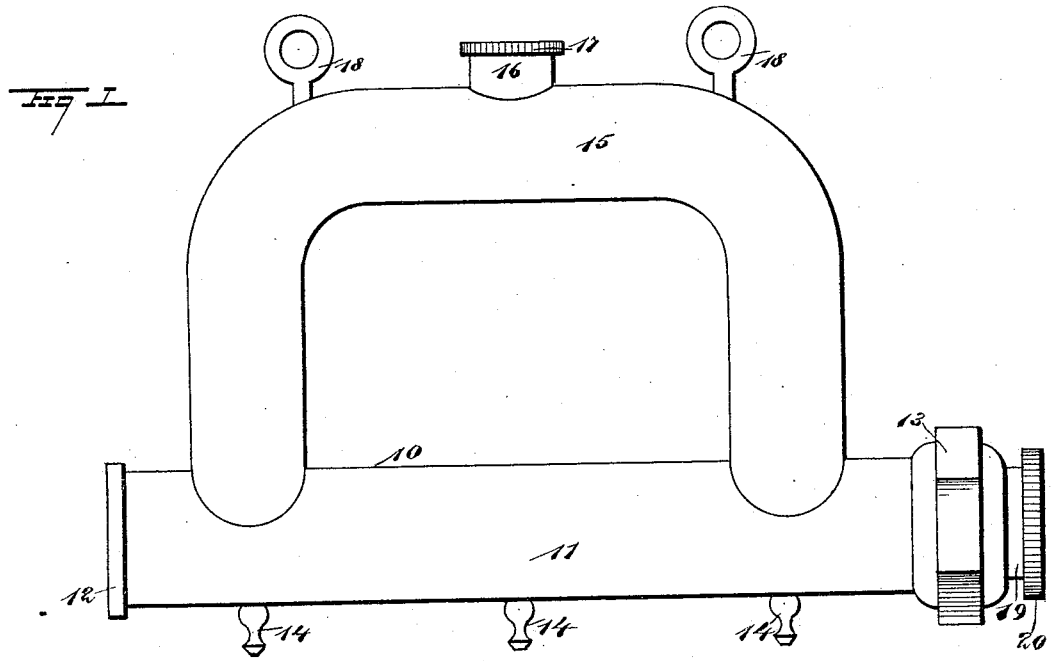
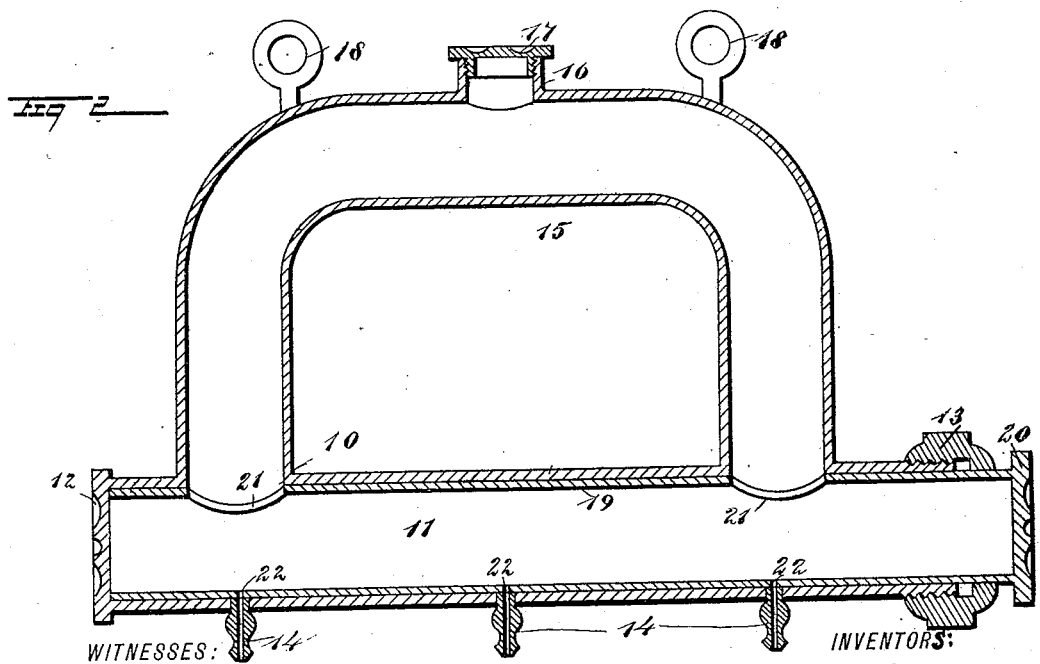
WITNESSES:
INVENTORS:
A. A. Taylor
BY W. C. Edwards
Munn & Co.
ATTORNEYS.

UNITED STATES PATENT OFFICE.

ALBERT A. TAYLOR AND WILLIAM C. EDWARDS, OF CORNWALL, NEW YORK.

LUBRICATOR.

SPECIFICATION forming part of Letters Patent No. 470,085, dated March 1, 1892.

Application filed October 17, 1891. Serial No. 409,030. (No model.)

*To all whom it may concern:*

Be it known that we, ALBERT A. TAYLOR and WILLIAM C. EDWARDS, both of Cornwall, in the county of Orange and State of New York, have invented a new and Improved Lubricator, of which the following is a full, clear, and exact description.

Our invention relates to improvements in that class of lubricators which are adapted to deliver oil upon moving mechanism; and the object of our invention is to produce a lubricator which is especially adapted to be suspended above moving belts and keep them well oiled and which is constructed in such a manner that it may be conveniently suspended and it may be made to deliver the requisite amount of oil.

Reference is to be had to the accompanying drawings, forming a part of this specification, in which similar figures of reference indicate corresponding parts in both the views.

Figure 1 is a side elevation of the lubricator, and Fig. 2 is a vertical longitudinal section of the same.

The lubricator 10 has a lower cylindrical reservoir 11, which is closed at one end, as shown at 12, and which is open at the other end, the open end having a packing-nut 13 screwed upon it, which packing-nut is adapted to fit the valve, as described below.

Opening from the under side of the reservoir 11 are drip-tubes 14, through which the oil flows to fall upon the mechanism beneath them. The upper portion of the lubricator-body consists of a yoke-like upper reservoir 15, which at the ends connects with the cylindrical reservoir 11, the ends of the yoke-like reservoir being arranged near the ends of the cylindrical reservoir, and the yoke-like reservoir has at the top an inlet-opening 16, which is provided with a removable screw-cap 17, by means of which it is kept closed.

At the upper side of the yoke-like reservoir 15 and near the ends thereof are eyes 18, which enable it to be conveniently suspended; but it is obvious that other means may be employed for suspending it. It will be seen that when the yoke-like reservoir is filled with oil the oil will flow downward into the cylindrical reservoir.

Within the cylindrical reservoir is a cylindrical valve 19, which extends the entire length of the cylindrical reservoir and projects from the open end thereof, fitting closely in the packing-nut 13 and having its outer end terminating in a head 20, which has a milled edge and serves as a handle by means of which the valve may be conveniently turned or pulled out. The valve 19 is provided with openings 21, which are adapted to register with the ends of the yoke-like reservoir 15, and the valve has also perforations 22, which are adapted to register with the bores of the drip-tubes 14. It will thus be seen that the valve may be turned slightly and prevent any oil from passing through the drip-tubes, and it may be turned, also, so as to entirely cut off the supply from the yoke-like reservoir 15. The valve may be adjusted so that the oil will flow through the drip-tubes somewhat rapidly, or by partially cutting off the bores of the tubes the oil may be made to drip very slowly. The valve is preferably adjusted by turning it; but it will be seen that it may be made to slide endwise with the same effect.

Having thus fully described our invention, we claim as new and desire to secure by Letters Patent—

1. A lubricator comprising a body consisting of a lower cylindrical reservoir and an upper reservoir opening therefrom, the cylindrical reservoir having drip-tubes opening from it, and a valve mounted in the cylindrical reservoir, said valve having openings therein to register with the bores of the drip-tubes and openings to register with the entrance to the upper reservoir, substantially as shown and described.

2. A lubricator comprising a body having a lower cylindrical reservoir with drip-tubes opening therefrom and an upper yoke-like reservoir having its ends connected with the cylindrical reservoir, means for suspending the body, and a valve mounted in the cylindrical reservoir and having openings adapted to register with the drip-tubes and with the entrance to the yoke-like reservoir, substantially as described.

ALBERT A. TAYLOR.
WILLIAM C. EDWARDS.

Witnesses:
JOHN ORR, Jr.,
HARVEY R. TAYLOR.